May 22, 1934.  G. LAFREDO ET AL  1,959,793
SPONGE FISHING NET
Original Filed Aug. 15, 1931
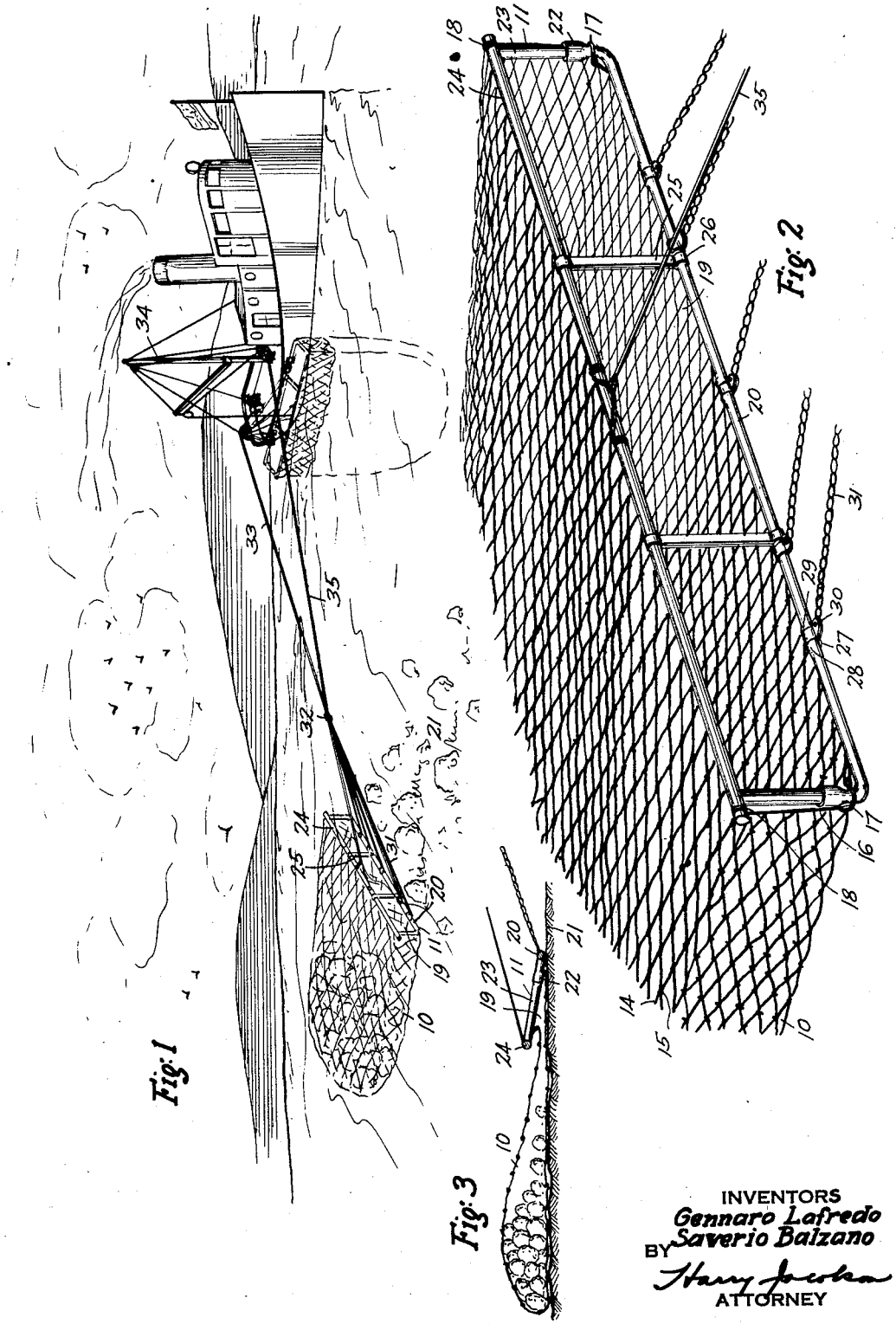
INVENTORS
Gennaro Lafredo
Saverio Balzano
BY
ATTORNEY Patented May 22, 1934

1,959,793

UNITED STATES PATENT OFFICE 1,959,793

SPONGE FISHING NET

Gennaro Lafredo and Saverio Balzano,
Brooklyn, N. Y.

Application August 15, 1931, Serial No. 557,252
Renewed February 17, 1934

4 Claims. (Cl. 43—4)

This invention relates to sponge fishing or harvesting devices, and contemplates the provision of means easily controllable from the deck of a vessel for dragging a marine bed, particularly, where a colony of marine sponges is likely to be growing, to sever the sponges from the mud or other material to which the sponges attach themselves and to scoop up the detached sponges.

By means of our invention, marine sponges may be harvested rapidly and efficiently without the necessity for diving, thereby effecting a substantial saving of labor, and avoiding the dangers to which the sponge fishers have heretofore been subjected.

Our invention contemplates the provision of simple, durable, comparatively inexpensive and efficient means, adapted to be fully controlled from a vessel and designed to maintain itself automatically in the correct operative position, for severing and gathering marine sponges. Our invention further contemplates the provision of means for harvesting sponges from depths unattainable by divers.

The various objects of our invention will be clear from the description which follows, and from the drawing, in which, Fig. 1 is a perspective view of our new sponge fishing net as it appears in operation.

Fig. 2 is a similar view on an enlarged scale of the frame for the net, and of part of the means for hoisting and otherwise manipulating the net, and Fig. 3 is a vertical section of our new device, showing the net lying on a marine bed, and showing the frame swung to net-closing position.

In that practical embodiment of our invention which we have illustrated by way of example, our new net comprises the net body 10, the frame designated generally by the numeral 11, and towing, hoisting and manipulating lines.

The body portion 10 of the net is made of two sets of strands 14, each set diagonally intersecting the other and formed of flexible cords twisted and knotted as at the intersections 15 in the usual manner in which fishing nets are made. The net body is suitably secured to the frame 11 as by means of a suitable line or sets of lines 16 passing through the end loops of the strands 14, and secured to a suitable multiple looped member as 17 of bent wire or the like supported by one of the frame members. It will be understood, however, that all or certain of the strand loops may be directly secured to one of the frame members, as is for example illustrated at 18.

In any case, the frame 11 distends the net, and normally maintains the mouth 19 thereof open.

Said frame 11 is of peculiar construction, being adapted not only to sink the net but also to cut the sponges from the mud or other objects to which they are attached, and to direct the separated sponges through the open mouth 19 of the net and into the interior thereof. In detail, the bottom member 20 of the frame is preferably made of a solid bar of metal, thereby giving sufficient weight to the frame to sink the net and to cause said bar to drag the marine bed 21. At its ends, the weighted bar 20 terminates in upstanding sockets 22, in which are arranged the uprights 23, said uprights being made preferably of comparatively buoyant though rigid and strong material such as wood. The upper elongated frame member 24 is preferably parallel to the bar 20 and is secured to the upper ends of the uprights 23 in any suitable manner, such as by means of mortise and tenon joints, or by any other suitable fastening means not necessary to be described in detail, and which will be obvious to those skilled in the art.

The upper frame member 24 is made of the same material as the uprights 23, being preferably made of wood to give said upper member buoyant properties in the water, so that it will be normally positioned above the bar 20. In order that the mouth 19 of the net may be normally maintained open, and closed when desired, it will be understood that the entire frame 11 may be swung about the axis of said lower member as a pivot, toward the position illustrated in Fig. 3. Suitable braces as 25 may be arranged between the upper and lower frame members at spaced intervals, said braces being sufficiently rigid to maintain the upper member against sagging and therefore being made preferably in the form of metal straps, looped as at 26 about the frame members 20 and 24. It will be understood that suitable bolts or other fastening means may be used, if desired, to secure the parts of each strap in place, should the strap be made of more than one piece of material.

Secured to the lower bar 20, as by means of clips 27, which are each loosely mounted between suitable projections 28 and 29 on said bar, and each of which terminates in a pair of adjacent lugs as 30, are the series of spaced chains 31, which are preferably gathered as at 32 and operated from the vessel, as by means of a suitable tow line and hoisting line 33.

It will be understood that the clips 27 are free to rotate about the bar 20 to adjust themselves to the line of pull, regardless of the angular positions of the lines 31, but are prevented from slipping along the bar by the projections 28 and 29.

It will further be understood that any suitable number of such clips 27 and chains 31 may be provided at the proper points along the bar to permit proper towing, and to permit the net to be hoisted to the level of the deck and into the position indicated by the dotted lines of Fig. 1, when the sponges are to be unloaded from the net.

It will further be understood that the chains 31 may be passed about suitable cleats on the deck of the vessel to hold the net vertical, while the unloading thereof proceeds as by means of a suitable derrick such as 34. An additional line as 35 independent of and unsecured to the chains 31 and similarly independent of the towing line 33, is suitably secured to the upper bar 24 whereby said bar may be dragged forwardly relatively to the bar 20, or the bar 20 may be dragged forwardly relatively to the bar 24. In the latter case, the upper bar 24 swings back under the pull exerted on the bar 20 and thereby closes the mouth 19, particularly, when the hoisting operation is about to be begun. Normally, however, the buoyant properties of the frame member 24 are sufficient to maintain the mouth 19 of the net open, the pull on the independent line 35 being adjusted toward that end. While said line 35 is shown in perspective, (Fig. 1), as apparently crossing the line 33, it is not to be confused therewith.

In the operation of our improved device, the net is first slung over the side of the vessel with both the towing and hoisting line 33, and the independent upper bar manipulating line 35 controlled from the deck of the vessel. The vessel is then started, the bar 20 causing the net to sink to the bottom to be dragged. Said bar 20 rests on the bottom but the upper frame bar 24, due to its buoyancy, tends to rise and thereby keeps the mouth of the net open. As the net is dragged along the bottom, it cuts the sponges loose and scoops the sponges up through the open mouth 19 of the net, and into the body 10 of the net where the sponges are retained. The speed of the vessel is, of course, controlled to permit the dragging operation to be properly carried out. When the net is full, the line 35 is released to allow the bar 24 to drop back into the position of Fig. 3, while the bar 20 is pulled forwardly by means of the line 33. The net, with the frame 11 swung back to close the mouth thereof, is then hoisted partly out of the water, and secured in unloading position alongside the vessel, as by means of the chains 31 as shown in the dotted line position of Fig. 1, whereby the unloading may proceed, the net being gathered up as the unloading progresses.

It will be seen that we have provided simple though efficient means for harvesting marine sponges, which means may be economically produced and effectively used to save labor and to avoid the dangers incident to previously known methods of and devices used in sponge fishing. It will further be seen that we have provided a durable and effectively operative device well adapted to meet the severe requirements of practical use.

While we have shown and described a certain specific embodiment of our invention, it will be understood that we do not intend to limit ourselves thereto but intend to claim our invention as broadly as may be permitted by the state of the prior art and the scope of the appended claims.

We claim:

1. A sponge fishing net comprising a net body having a normally open mouth, a frame arranged adjacent the periphery of, and operatively connected to and normally maintaining the mouth of the net open, said frame comprising an elongated weighty metallic member rounded at its ends and having a series of pairs of projections thereon, a buoyant elongated upper member parallel to the metallic member, spaced metallic straps looped about and connecting said members, and means secured to said frame for manipulating the net and the frame, comprising a metallic clip loosely mounted on the weighty member between each pair of projections, a towing and manipulating line secured to the clips, and a second independent line secured to the buoyant member.

2. In a sponge fishing net provided with a mouth having a series of end loops, a substantially rectangular frame, the lower part of said frame being weighty to sink the net to a marine bed, and the upper part being buoyant to maintain the net with its mouth normally open, a pair of independent lines each secured to said frame for manipulating the frame and the net, each of said lines being manipulatable independently of the other, multiple looped wire members at the ends of the frame, and lines passing through said end loops and secured to the wire members.

3. In a sponge fishing net, a net body having an open end, a frame arranged adjacent and secured to said open end to provide a normally open mouth for the net, said frame including a weighty metallic lowermost member to sink the net to the bottom of a body of water, an upper substantially parallel member of buoyant material maintaining the frame normally vertical, means for connecting said members, clips mounted on said lower member and rotatable thereon, projections on the lower member adjacent the clips and forming means for preventing the clips from becoming displaced on the lower member, lines secured to said clips and a line secured to the upper member and independent of the first-mentioned lines for controlling the position of said upper member relatively to the lower member.

4. In a sponge fishing net, a net body having an open end providing a mouth for the entrance of sponges, a frame secured adjacent said mouth to shape said mouth and to maintain said mouth normally open, said frame including a lowermost elongated weighty member for sinking the net to the bottom of a body of water and to sever sponges from the objects to which said sponges are attached when the net is dragged over the bottom, an upper member on said frame parallel to the weighty member and made of comparatively buoyant material for maintaining said frame in substantially vertical position until moved from said position, means for connecting and for bracing said members, clips loosely mounted on the lower member, means on the lower member for preventing longitudinal movement of said clips, lines secured to said clips, and a line secured to the upper buoyant member for manipulating the same to swing the frame and to open and close the mouth of the net, said lines being independent of each other to permit independent manipulation of said members and to permit manipulation of the net, irrespective of the angular positions of said lines.

GENNARO LAFREDO.
SAVERIO BALZANO.